Dec. 10, 1929. R. C. COUPLAND 1,739,125
PEDESTAL MOUNT FOR AIRCRAFT GUNS
Filed May 7, 1927 2 Sheets-Sheet 1
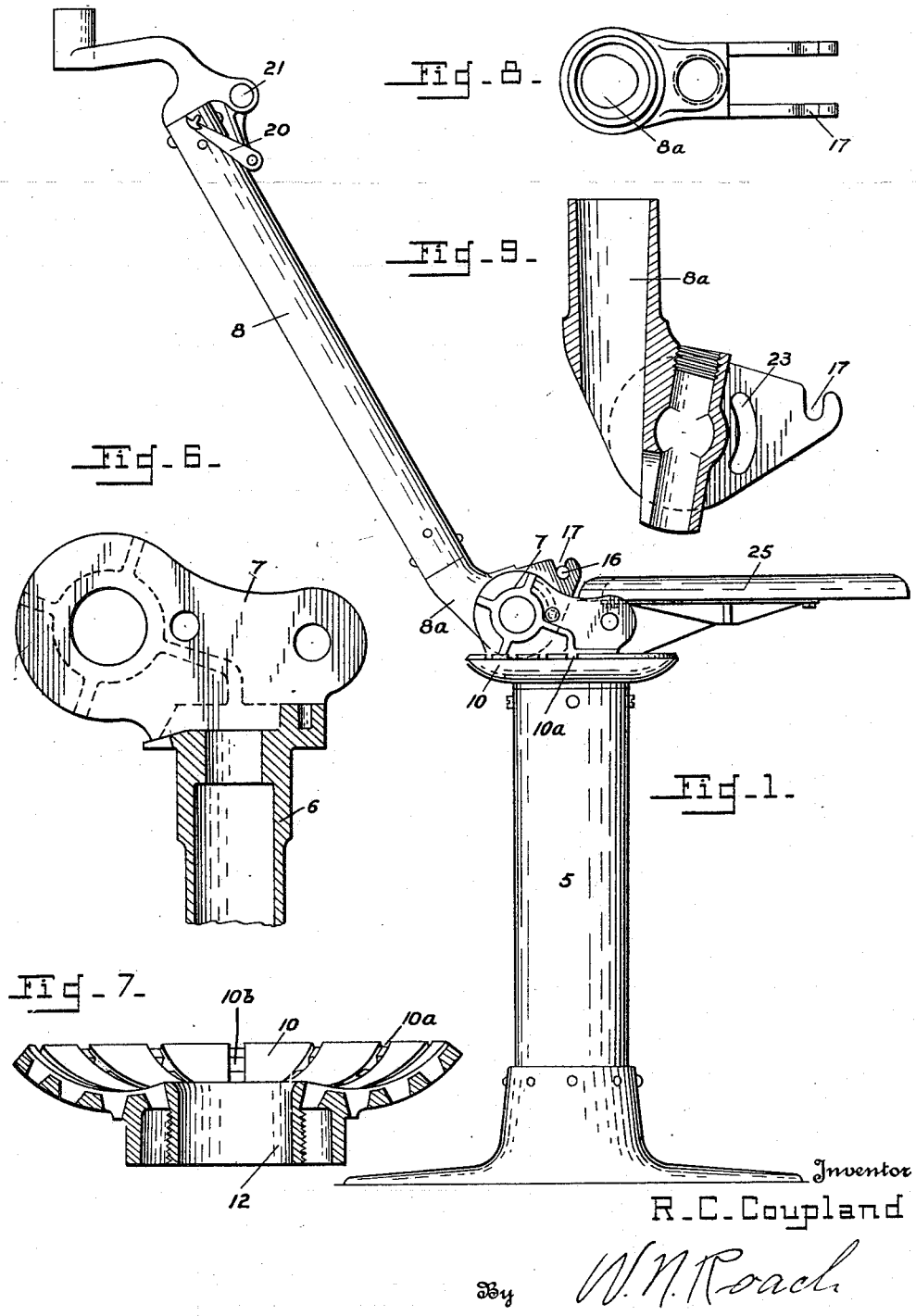

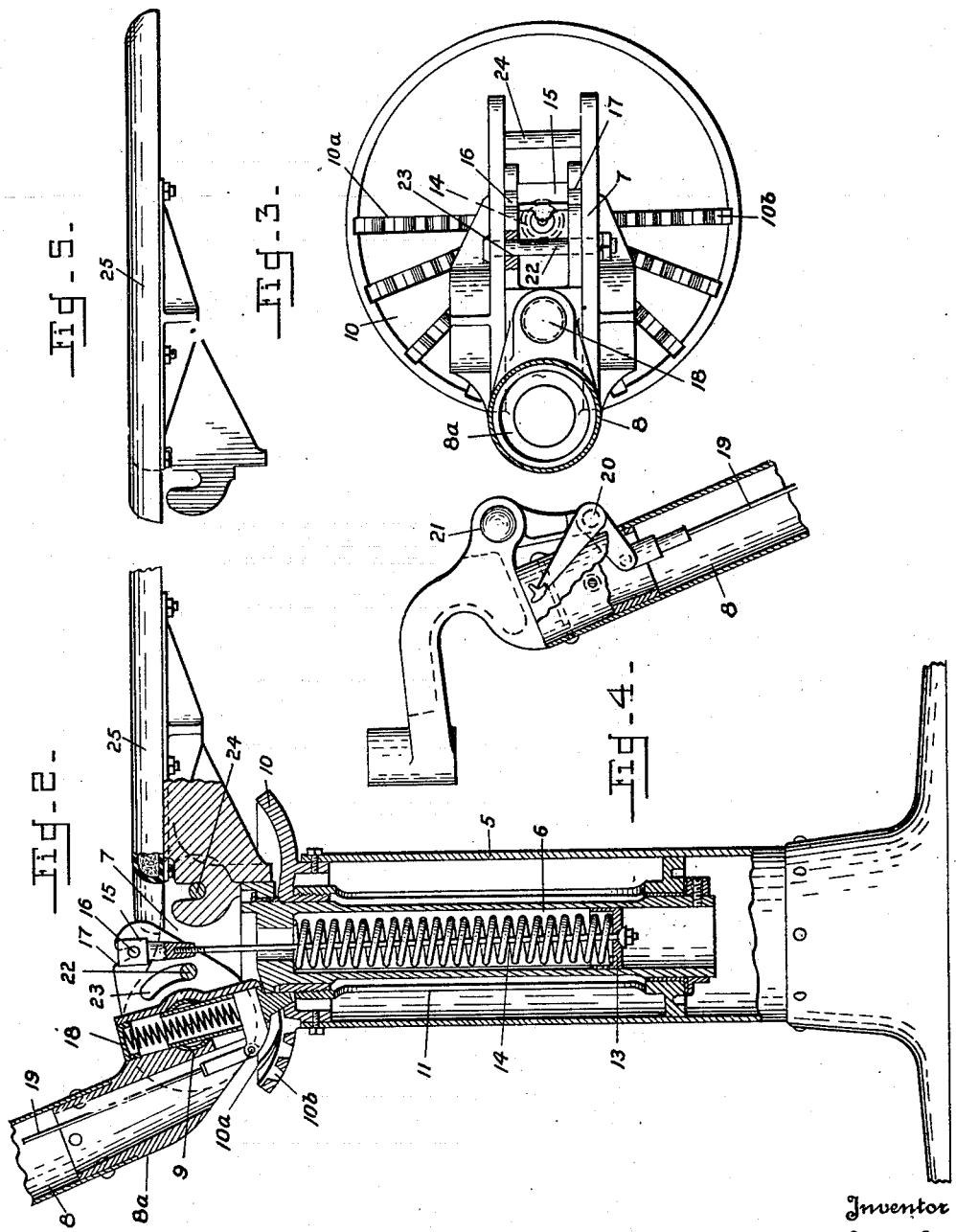

Patented Dec. 10, 1929

1,739,125

UNITED STATES PATENT OFFICE

RICHARD C. COUPLAND, OF DAYTON, OHIO

PEDESTAL MOUNT FOR AIRCRAFT GUNS

Application filed May 7, 1927. Serial No. 189,554.

(GRANTED UNDER THE ACT OF MARCH 3, 1883, AS AMENDED APRIL 30, 1928; 370 O. G. 757)

The invention described herein if patented may be manufactured and used by or for the Government for governmental purposes without the payment to me of any royalty thereon.

The subject of this invention is a pedestal mount for aircraft guns.

In providing a gun mount for aircraft consideration must be given to the limitations imposed by the characteristics of the ship and to the facility of installation and operation of the mount in different types of cockpits. In addition the mount must be of a minimum weight consistent with stability and flexibility.

The present mount in conforming to these requirements presents a distinct departure in design from the typical scarf mounts heretofore universally used. The mount is characterized broadly by a fixed pedestal carrying an adjustable gun supporting standard connected to an equilibrator inclosed in the pedestal.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of the assembled mount;

Fig. 2 is a detail longitudinal sectional view of the pedestal and the foot of the standard;

Fig. 3 is a fragmentary plan view, with the seat removed, of the structure shown in Fig. 2;

Fig. 4 is a detail view partly in section of the head of the standard;

Fig. 5 is a detail view in side elevation of the seat;

Fig. 6 is a detail view of the head of the pintle;

Fig. 7 is a sectional view through the pedestal cap;

Figs. 8 and 9 are respectively plan and sectional views of the foot of the standard.

Referring to the drawings by numerals of reference:

The mount consists of the pedestal 5 inclosing a pintle 6 formed at its upper end with a yoke 7 in which a gun supporting standard 8 is trunnioned on the pin 9. The pintle is supported by the rigid cap plate 10 of the pedestal and is confined at its lower extremity by a sleeve 11 which is threaded to an annular flange 12 on the cap.

The pintle is cylindrical and incloses an equilibrator mechanism consisting of the piston 13 whose rod extends upwardly between the yoke for attachment to the foot $8^a$ of the standard and which is impelled by a force herein shown as exerted by a spring 14 of sufficient intensity to counter-balance the weight of the standard and a gun mounted thereon. In order that this force may be varied to allow for the mounting of guns of different types and in order that an adjustment may be made with facility and dispatch the end of the piston rod is threaded in a block 15 which is provided with trunnions 16 receivable in recesses 17 in the bifurcated foot of the standard.

For the purpose of securely holding the standard against horizontal and vertical displacement a plunger 18 is mounted in its foot and is arranged to engage specified points in the rigid cap 10 of the pedestal. These points are defined by a series of radial grooves $10^a$ in which are spaced tapered openings $10^b$. Any number of such grooves and openings consistent with the strength of the cap may be provided. The plunger is recessed to receive one extremity of a rigid control member 19 inclosed by the standard and actuated by a bell crank lever 20 from a position adjacent the hand grip 21 at the head of the standard. The control of the standard is thereby centralized at the gun and by a simple operation the standard may be unlocked and adjusted to the desired horizontal and vertical position either for convenience of firing or the accommodation of the mount for the cockpit. The head $8^b$ of the standard is arranged for the reception of a gun cradle adaptor, not shown. Angular elevation of the standard is limited by a pin 22 carried by the yoke 7 and extending through a slot 23 in the standard.

The yoke likewise carries a pin 24 serving to anchor a seat 25 which may be readily removed and placed in a rack in the ship when the gunner prepares for action.

It is evident from the foregoing description that the various parts of the gun mount may be readily detached from the pedestal 5 and, when the plane is not used as a fighting plane, the pedestal may be used as a base or support for other purposes, such as a support for a seat, if desired.

While there has been shown in the drawings and described in the foregoing part of this specification a fixed cap 10 with radial grooves and tapered opening 10$^b$, it is to be understood that such showing and description is by way of illustration only and it is not intended to limit the invention to this specific structure, as many other methods of accomplishing the desired result are well known to or would readily occur to those skilled in the art.

Though this mount was designed primarily for use on aircraft it is to be understood that there is no intention of limiting the mount to such use as the same may readily be employed as an anti-aircraft mount in which instance it would be mounted on a truck or movable vehicle, or the mount may be desirable in any instance where flexibility and lightness of weight would be primary considerations.

I claim:

1. A mount for guns embodying a pedestal, a cap fixed thereto and having radial grooves with openings therein, a cylindrical pintle within the pedestal and having a yoke resting on the cap, a standard trunnioned in the yoke, a piston within the pintle and connected to the foot of the standard, a plunger in the standard engageable with the grooves and openings in the cap, a control member for said plunger inclosed in the standard and a lever mounted at the head of the standard and connected to the control member.

2. A mount for guns embodying a pedestal, a cap fixed thereto, a cylindrical pintle within the pedestal and having a yoke resting on the cap, a standard trunnioned in the yoke, a piston within the pintle and connected to the foot of the standard, a plunger in the standard engageable with the cap, a control member for said plunger inclosed in the standard and a lever mounted at the head of the standard and connected to the control member.

3. A mount for guns embodying a pedestal, a cap fixed thereto, a cylindrical pintle within the pedestal and having a yoke resting on the cap, a standard trunnioned in the yoke, a piston within the pintle and connected to the foot of the standard, a plunger in the standard engageable with the cap and means for controlling the plunger.

4. A mount for guns embodying a pedestal, a yoke mounted therein, a standard trunnioned in the yoke, an equilibrator within the pedestal and connected to the standard and means for locking the standard in fixed position.

5. A mount for guns embodying a pedestal, a yoke mounted therein, a standard trunnioned in the yoke, and an equilibrator within the pedestal and connected to the standard.

6. A mount for guns embodying a pedestal, a yoke mounted therein, a standard trunnioned in the yoke, means for locking the standard in fixed position and a control for the locking means carried within the standard and operated from a position adjacent the head of the standard.

7. A mount for guns embodying a pedestal, a yoke mounted therein, a standard trunnioned in and transversely of the yoke, means for locking the standard to the pedestal.

8. A mount for guns embodying a pedestal, a yoke mounted therein, a gun supporting standard trunnioned in the yoke, and a seat detachably secured to the yoke.

RICHARD C. COUPLAND.